United States Patent
Desta et al.

(10) Patent No.: US 6,557,673 B1
(45) Date of Patent: May 6, 2003

(54) INTEGRAL PARK BRAKE/EDDY CURRENT BRAKE ASSEMBLY

(75) Inventors: Girma Gete Desta, Southfield, MI (US); Kevin Jerome Pavlov, Livonia, MI (US); Scott Christopher Tonn, Farmington Hills, MI (US); Zheshing Li, Detroit, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/032,166

(22) Filed: Dec. 21, 2001

(51) Int. Cl.[7] .................................................. F16F 11/00
(52) U.S. Cl. ......................... 188/271; 188/78; 188/267
(58) Field of Search ................................. 188/156, 158, 188/159, 160, 161, 164, 325, 78, 267, 271

(56) References Cited

U.S. PATENT DOCUMENTS

| | | | |
|---|---|---|---|
| 3,767,015 A | * | 10/1973 | Odier .......................... 188/71.6 |
| 4,128,147 A | * | 12/1978 | Lafuente Ruberte ........ 188/164 |
| 4,800,310 A | * | 1/1989 | Nakao et al. ............... 310/105 |
| 5,154,623 A | | 10/1992 | Kuwahara |
| 5,219,050 A | | 6/1993 | Kubomiya |
| 5,746,294 A | * | 5/1998 | Lee .............................. 188/163 |
| 6,253,885 B1 | * | 7/2001 | Tsai et al. .................... 188/158 |
| 6,336,530 B1 | * | 1/2002 | Hottle ......................... 188/171 |

FOREIGN PATENT DOCUMENTS

| | | | | |
|---|---|---|---|---|
| JP | 359169358 A | * | 9/1984 | .................. 310/93 |
| JP | 403128897 A | * | 5/1991 | ................. 180/65.1 |
| JP | 02000316272 A | * | 11/2000 | ................. 188/158 |

* cited by examiner

*Primary Examiner*—Jack Lavinder
*Assistant Examiner*—Benjamin A. Pezzlo
(74) *Attorney, Agent, or Firm*—Brinks Hofer Gilson & Lione

(57) ABSTRACT

An eddy current braking apparatus is disclosed. The apparatus includes a stator, a coil of wire, and a drum. The stator has a plurality of poles and is mountable to a frame of a vehicle. The coil of wire is wound about each of the plurality of poles and wherein adjacent coils are electrically connected to form an electromagnet. The drum is adapted to receive a wheel and tire assembly and wherein the drum is rotatably mounted to a vehicle axle, and wherein an eddy current is developed between the drum and the stator, from the relative motion of the drum with respect to the stator, thereby retarding rotation of the drum and wheel and tire assembly.

17 Claims, 3 Drawing Sheets

INTEGRAL PARK BRAKE/EDDY CURRENT BRAKE ASSEMBLY

TECHNICAL FIELD OF THE INVENTION

The present invention relates to eddy current brakes for decelerating a road vehicle and to eddy current braking assemblies having an integral frictional brake.

BACKGROUND ART

Eddy current braking systems typically include a rotor mounted to a rotatable shaft, such as a drive shaft for driving wheels of a vehicle and a magnetic power source, such as an electromagnet or a permanent magnet, mounted on a frame of the vehicle. Eddy currents are produced in the rotor due to a relative velocity difference between the rotor and the stationary magnetic power source. The eddy currents generate a braking torque retarding the rotation of the rotor, thereby decelerating the vehicle.

While prior art eddy current braking systems achieve their intended purpose, many problems still exist. For example, prior art eddy current braking systems are not readily packageable with conventional braking systems. Thus, prior art eddy current braking systems require additional packaging space which is difficult to obtain in current vehicles today.

Therefore, there is a need for a new and improved eddy current braking system for a motor vehicle. The new and improved eddy current braking system should not require additional vehicle packaging space and should be packageable with current braking systems including, for example, a frictional emergency brake.

SUMMARY OF THE INVENTION

In accordance with the present invention, an eddy current braking apparatus is provided. The apparatus includes, a stator having a plurality of poles mountable to a frame of a vehicle, a coil of wire wound about each of the plurality of poles, wherein adjacent coils are electrically connected to form an electromagnet, a drum adapted to receive a wheel and tire assembly wherein the drum is rotatably mounted to a vehicle axle, and wherein an eddy current is developed between the drum and the stator, from the relative motion of the drum with respect to the stator, thereby retarding rotation of the drum and wheel and tire assembly.

In an aspect of the present invention, the apparatus includes an end cap fixedly secured to each of the plurality of poles.

In another aspect of the present invention, the coil of wire includes a flat wire.

In another aspect of the present invention, the stator has a stator mounting plate fixed to a vehicle frame and configured for mounting the stator thereon.

In another aspect of the present invention, the stator is made of 1005 steel.

In another aspect of the present invention, the drum is made of 1005 steel.

In still another aspect of the present invention, electromagnets are created in a north and south pole of adjacent poles.

In still another aspect of the present invention, a changing magnetic flux field is created between the stator poles and a surface of the drum when the coil is electrically energized.

In still another aspect of the present invention, a frictional brake fixed to the vehicle frame and adapted for frictional contact with the drum, thereby preventing rotation of the drum.

In still another aspect of the present invention, the frictional brake is fixedly secured to the stator.

In yet another aspect of the present invention, an eddy current brake apparatus, having a stator having a plurality of poles mountable to a frame of a vehicle, a coil of wire wound about each of the plurality of poles, wherein adjacent coils are electrically connected to form an electromagnet, a drum adapted to receive a wheel and tire assembly wherein the drum is rotatably mounted to a vehicle axle, a frictional brake in selective frictional contact with the drum for selective rotation thereof, wherein an eddy current is developed between the drum and the stator, from the relative motion of the drum with respect to the stator, thereby retarding rotation of the drum and wheel and tire assembly.

Further aspects, features and advantages of the invention will become apparent from consideration of the following erudite description and the appended claims when taken in connection with the accompanying drawings.

DETAILED DESCRIPTION OF THE PREFERRED EMBODIMENT

Figure 1:
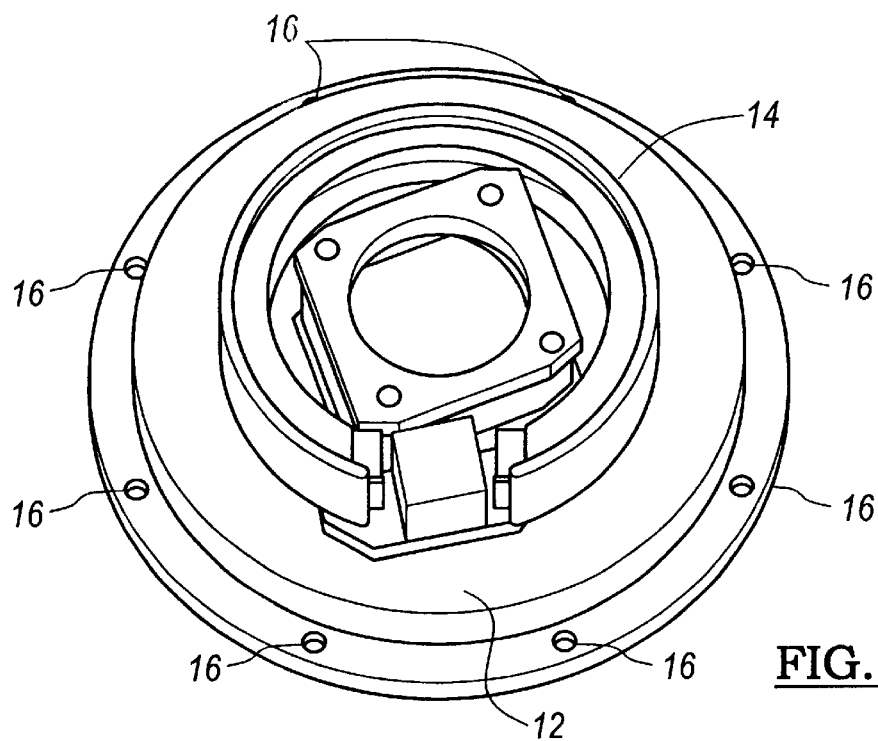
FIG. 1 is a front view of a stator mounting plate of the eddy current brake apparatus of the present invention.
Figure 2:
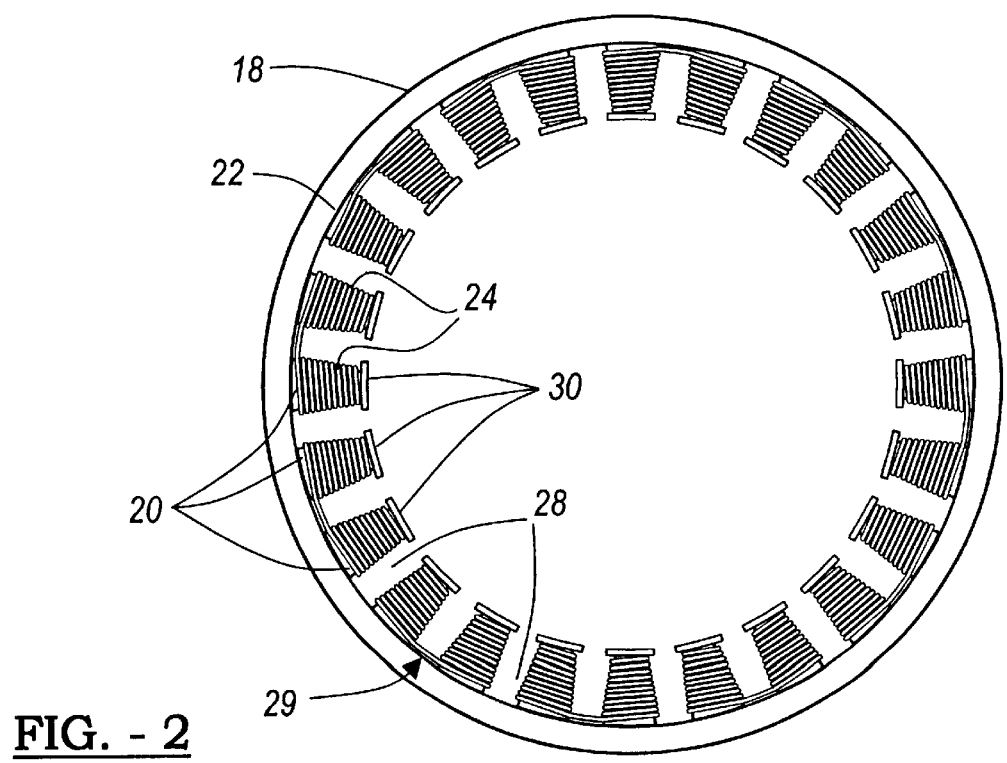
FIG. 2 is a front view of a stator of the eddy current brake apparatus of the present invention.
Figure 3:
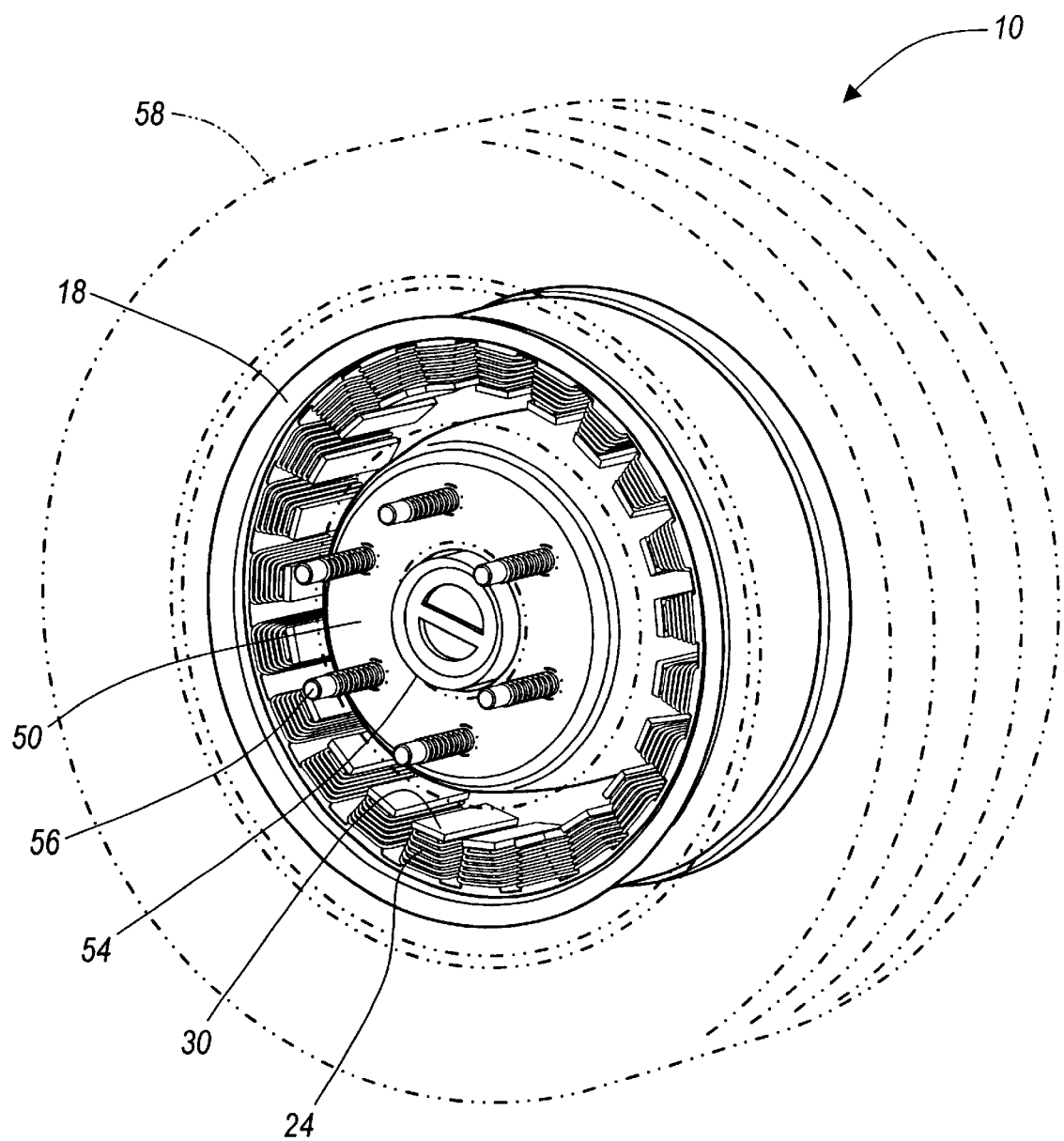
FIG. 3 is a perspective view of the eddy current brake apparatus mounted to a vehicle, in accordance with the present invention.

Referring now to FIGS. 1–3, a preferred embodiment of an eddy current braking apparatus 10 having an integral frictional brake for use as an emergency brake is illustrated, in accordance with the present invention. Eddy current braking apparatus 10 is secured to a vehicle frame (not shown) by a stator mounting plate 12. Stator mounting plate 12 further includes a conventional frictional brake device 14 mounted thereon. Frictional brake device 14 is typically used as an emergency brake. Operation of frictional brake 14 will be described hereinafter. A plurality of stator mounting holes or apertures 16 are disposed around a periphery of the stator mounting plate 12 for securing a stator 18, (shown in FIG. 2) thereto.

Referring now to FIG. 2, stator 18 is shown in further detail, in accordance with the present invention. Preferably, stator 18 is made from 1005 steel or similar material and has all the mechanical and electrical properties, as are well known in the art, and that are specified in the 1005 steel standards. Stator 18 includes a plurality of poles 20 which are disposed around a stator ring 22 and extend radially inward therefrom. Each pole 20 is wound with a flat wire creating a winding or coil 24. The flat wire configuration is advantageously chosen to increase the number windings around the pole and within the stator slots 28. Increasing the number of windings increase or enhances the magnetic field generated therein. The flat wire, preferably, is 10 gage magnet wire having an insulating coating. Two adjacent coils 24 are electrically connected to produce an electromagnet 29 generally having a horseshoe shape. One pole 20 in the pair comprising the electromagnet 29, is a north pole of the magnet while the other pole is a south pole. The pairing of adjacent poles to form electromagnets 29 continues around the entire circumference of stator 18.

A shoe 30 in the shape of a flat rectangular plate is mounted on each pole to distribute the magnetic flux generated by electromagnet 29 and prevents the flat wire windings 24 from sliding off poles 20.

A fully assembled eddy current braking apparatus 10 having an integral parking brake 14 is shown in FIG. 3, in accordance with the present invention. After stator 18 is mounted to the stator mounting plate 12 using conventional screws or bolts, holes 16 and threaded bores (not shown) in stator 18, an eddy current brake drum 50 is mounted to the vehicle transmission shaft 52 (shown in FIG. 4) with a transmission shaft bearing 54 and is rotatable thereon. Drum 50 includes a plurality of wheel mounting bolts or studs 56 for receiving a conventional vehicle wheel and tire assembly 58. As will be described in further detail hereinafter, eddy currents are produced between the stator 18 and drum 50 by the rotation of the wheel and tire assembly 58 and drum 50 relative to the vehicle frame whereon stator 18 is mounted.

Figure 4:
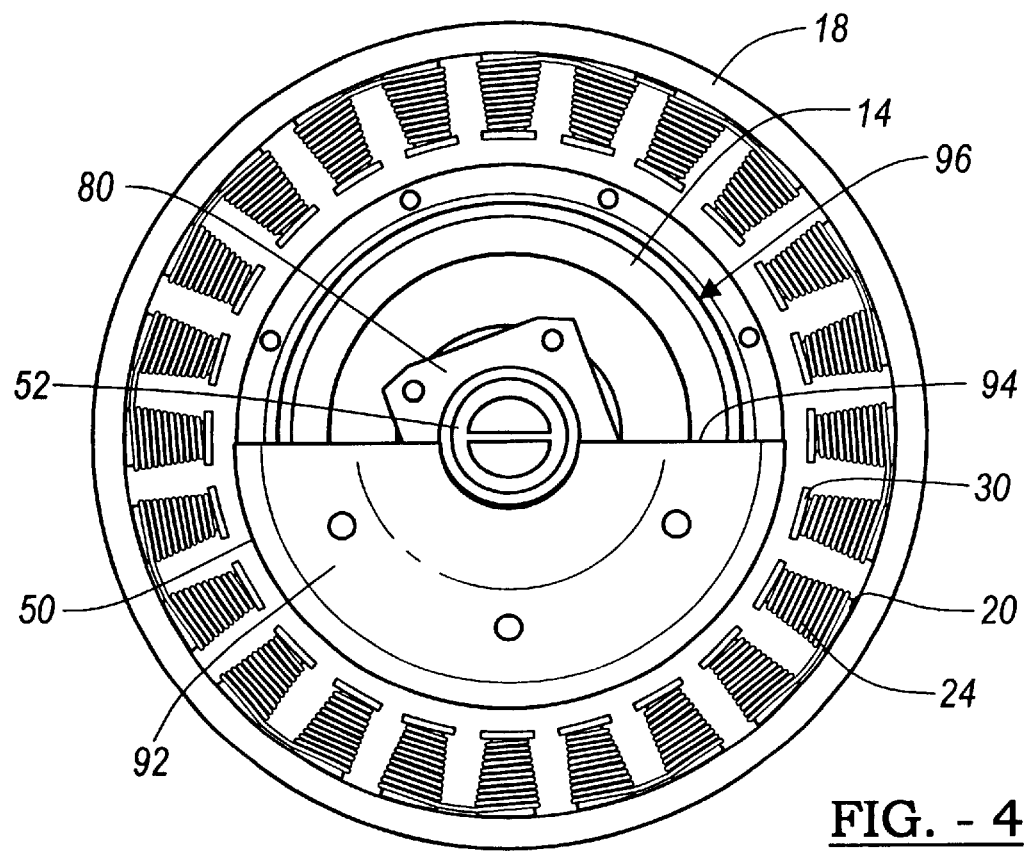
FIG. 4 is a perspective view of the eddy current brake apparatus showing a partial cut-away view of the drum, in accordance with the present invention.
Figure 5:
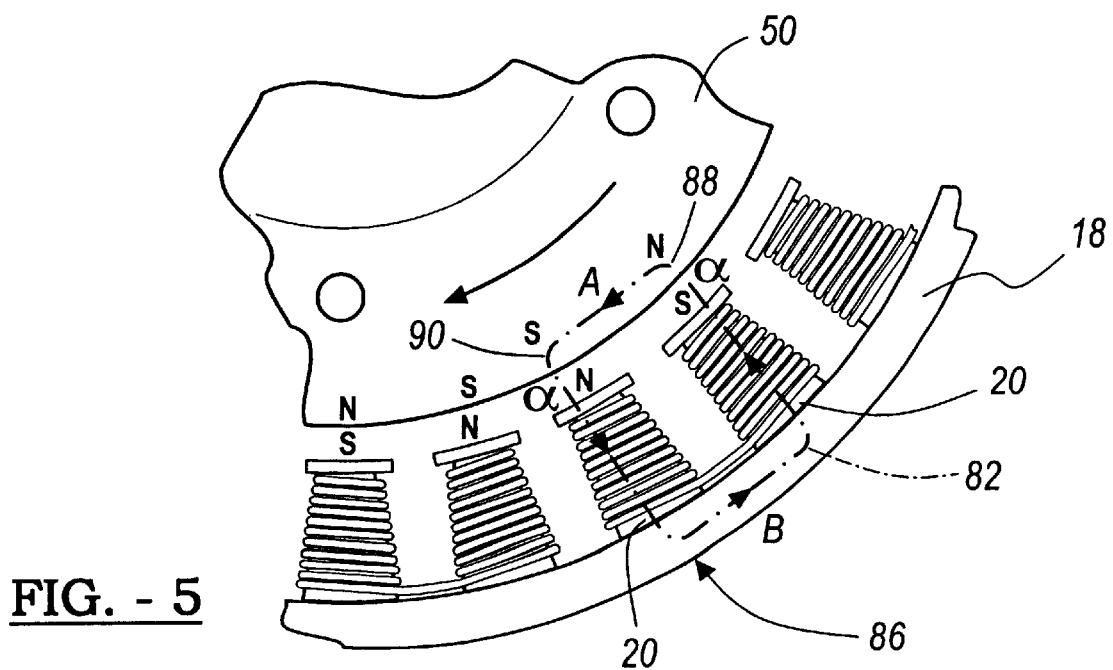
FIG. 5 is a partial view of the drum and stator illustrating the presence of the magnetic circuit created therebetween, in accordance with the present invention.

Referring now to FIGS. 4 and 5, the operation of eddy current braking apparatus 10 with integral emergency brake 14 will now be described, in accordance with the present invention. Stator 18 and stator mounting plate 12 assembly being mounted to a fixed flange 80 integral with the vehicle frame is nonrotatable with respect to the frame. Drum 50, shown in (FIG. 4) as a partial cut-a-way view is mounted to rotatable transmission shaft 52 with transmission shaft bearing 54 and rotates at wheel speed. Wheel speed is typically three times slower than the speed of the transmission shaft 52. When the windings 24 are energized, a magnetic circuit 82, as indicated by dashed lines in FIG. 5 is created. Electromagnet 29 formed from two adjacent poles 20 and flat wire windings 24 magnetize opposing drum surfaces 88 and 90. Depending on the polarity of the current running through windings 24, a north pole is created in one of the poles 20 and a south pole is created in the other adjacent pole 20. Accordingly, the drum portion 88 would be magnetized as a north pole opposing the south pole of electromagnet 29 and drum portion 90 would be magnetized as a south pole opposing the north pole of electromagnet 29.

The energized electromagnet 29 creates a magnetic flux field between drum 50 and the poles 20 of stator 18, thus Lorenz forces are created and act to retard the rotation of drum 50 with respect to stator 18. The present invention has many advantages and benefits over the prior art including, for example, the dual utilization of drum 50. An outer surface 92 of drum 50 interacts with stator 18 to create eddy currents while an inner surface 94 interacts with frictional brake device 14. Frictional brake device 14 retards the rotation of drum 50 with respect to the vehicle frame by frictionally contacting inner surface 94 of drum 50. Frictional brake device 14 is a conventional emergency brake having a frictional surface 100 with a high coefficient of friction for contacting inner surface 94 of drum 50 to arrest the rotation of drum 50.

Therefore, the present invention has many advantages and benefits over prior art eddy current retarders. For example, apparatus 10 of the present invention is adapted for use within the wheel space of a vehicle thus, conserving packaging space. Furthermore, apparatus 10 operates at wheel speed to generate the required braking torque. Moreover, the present invention integrates a conventional emergency brake to fix the rotation of a vehicle's wheels when the vehicle is stationary.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. An eddy current braking apparatus, comprising:
   a stator having a plurality of poles, wherein the stator is mountable to a frame of a vehicle;
   a coil of wire wound about each of the plurality of poles, wherein adjacent coils are electrically connected to form an electromagnet; and
   a drum receiving a wheel and tire assembly wherein the drum is rotatably mounted to a vehicle axle, a frictional brake fixed to the vehicle frame and adapted for frictional contact with the drum, thereby preventing rotation of the drum; and
   wherein an eddy current is developed between the drum and the stator, from the relative motion of the drum with respect to the stator, thereby retarding rotation of the drum and wheel and tire assembly.

2. The apparatus of claim 1, further comprising an end cap fixedly secured to each of the plurality of poles.

3. The apparatus of claim 1, wherein the coil of wire is comprised of flat wire.

4. The apparatus of claim 1, wherein the stator further comprises a stator mounting plate fixed to a vehicle frame and configured for mounting the stator thereon.

5. The apparatus of claim 1, wherein the stator is made of 1005 steel.

6. The apparatus of claim 1, wherein the drum is made of 1005 steel.

7. The apparatus of claim 1, wherein electromagnets are created in a north and a south pole of adjacent poles.

8. The apparatus of claim 1, wherein a changing magnetic flux field is created between the stator poles and a surface of the drum when the coil is electrically energized.

9. The apparatus of claim 1, wherein the frictional brake is fixedly secured to the stator.

10. An eddy current brake apparatus, comprising:
    a stator having a plurality of poles, wherein the stator is mountable to a frame of a vehicle;
    a coil of wire wound about each of the plurality of poles, wherein adjacent coils are electrically connected to form an electromagnet;
    a drum receiving a wheel and tire assembly wherein the drum is rotatably mounted to a vehicle axle; and
    a frictional brake in selectively frictional contact with the drum for selective inhibiting rotation thereof, and
    wherein an eddy current is developed between the drum and the stator, from the relative motion of the drum with respect to the stator, thereby retarding rotation of the drum and wheel and tire assembly.

11. The apparatus of claim 10, further comprising an end cap fixedly secured to each of the plurality of poles.

12. The apparatus of claim 10, wherein the coil of wire is comprised of flat wire.

13. The apparatus of claim 10, wherein the stator further comprises a stator mounting plate fixed to a vehicle frame and configured for mounting the stator thereon.

14. The apparatus of claim 10, wherein the stator is made of 1005 steel.

15. The apparatus of claim 10, wherein the drum is made of 1005 steel.

16. The apparatus of claim 10, wherein electromagnets are created in a north and a south pole of adjacent poles.

17. The apparatus of claim 10, wherein the stator is made of 1005 steel.

* * * * *